United States Patent
Liu et al.

(10) Patent No.: US 7,988,158 B2
(45) Date of Patent: Aug. 2, 2011

(54) DRIVING DEVICE FOR ADJUSTING AN ORIENTATION OF A VEHICLE WHEEL

(75) Inventors: Tyng Liu, Lugong (TW); Cheng-Shun Jiang, Lugong (TW); Chih-Jung Yeh, Lugong (TW)

(73) Assignee: Automotive Research and Testing Center, Lugong (TW)

( * ) Notice: Subject to any disclaimer, the term of this patent is extended or adjusted under 35 U.S.C. 154(b) by 0 days.

(21) Appl. No.: 12/589,414

(22) Filed: Oct. 23, 2009

(65) Prior Publication Data

US 2011/0095499 A1    Apr. 28, 2011

(51) Int. Cl.
*B60G 3/26* (2006.01)

(52) U.S. Cl. ........... 280/5.521; 280/86.751; 280/86.754; 280/86.757; 280/5.52

(58) Field of Classification Search ............... 280/5.521, 280/5.522, 5.52, 86.757, 86.75, 86.751, 85.754, 280/86.754

See application file for complete search history.

(56) References Cited

U.S. PATENT DOCUMENTS

| | | | |
|---|---|---|---|
| 4,973,070 A | 11/1990 | Menichini et al. | |
| 6,386,553 B2 * | 5/2002 | Zetterstrom | 280/5.51 |
| 6,962,355 B2 * | 11/2005 | Kwon | 280/86.75 |
| 7,673,883 B2 * | 3/2010 | Damm | 280/5.521 |

\* cited by examiner

*Primary Examiner* — Eric Culbreth
(74) *Attorney, Agent, or Firm* — Allston L. Jones; Peters Verny, LLP

(57) ABSTRACT

A driving device for adjusting an orientation of a wheel attached to a vehicle body includes: a driving unit; a lifting shaft extending along a first axis and capable of moving axially when driven by the driving unit; a suspension arm extending along a transverse direction intersecting the first axis, and having one end adapted for connection with the wheel and another end disposed in proximity to the lifting shaft; and a cam unit including at least one roller connected to one of the lifting shaft and the suspension arm, and an inclined cam face provided on the other one of the lifting shaft and the suspension arm. The roller and the inclined cam face interact with each other such that the suspension arm moves along the transverse direction.

8 Claims, 7 Drawing Sheets

US 7,988,158 B2

DRIVING DEVICE FOR ADJUSTING AN ORIENTATION OF A VEHICLE WHEEL

BACKGROUND OF THE INVENTION

1. Field of the Invention

This invention relates to a vehicle driving system, more particularly to a driving device for adjusting an orientation of a vehicle wheel.

2. Description of the Related Art

FIGS. 1 and 2 show a conventional driving device 5 for adjusting an orientation of a vehicle wheel that is disclosed in U.S. Pat. No. 4,973,070. The driving device 5 is attached to a vehicle body, and includes a motor 1, two screw rods 2 driven by the motor 1, two threaded sleeves 3 respectively and threadedly sleeved around the screw rods 2, and two link rods 4 respectively connecting to the threaded sleeves 3. One of the link rods 4 is connected to the vehicle wheel, and the other one of the link rods 4 is connected to the vehicle body. When the motor 1 is activated, the two link rods 4 are moved toward and away from each other so as to adjust the orientation of the vehicle wheel.

However, since the conventional driving device 5 forms a suspension arm for connecting the vehicle wheel and the vehicle body by combining the motor 1, the screw rods 2, the sleeves 3 and the link rods 4, an unsprung mass of the vehicle is increased. In addition, because the screw rods 2, the link rods 4, and the sleeves 3 cooperatively form a multi-section suspension arm, and because the screws 2 are connected threadedly to the sleeves 3, the robustness of the entire suspension arm is not satisfactory.

SUMMARY OF THE INVENTION

An object of the present invention is to provide a driving device for adjusting an orientation of a wheel with a reduced unsprung mass and a relatively high robustness.

Accordingly, a driving device for adjusting an orientation of a wheel attached to a vehicle body comprises: a driving unit; a lifting shaft extending along a first axis and capable of moving axially when driven by the driving unit; a suspension arm extending along a transverse direction intersecting the first axis, and having one end adapted for connection with the wheel and another end disposed in proximity to the lifting shaft; and a cam unit including at least one roller connected to one of the lifting shaft and the suspension arm, and an inclined cam face provided on the other one of the lifting shaft and the suspension arm. The roller and the inclined cam face interact with each other such that the suspension arm moves along the transverse direction.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
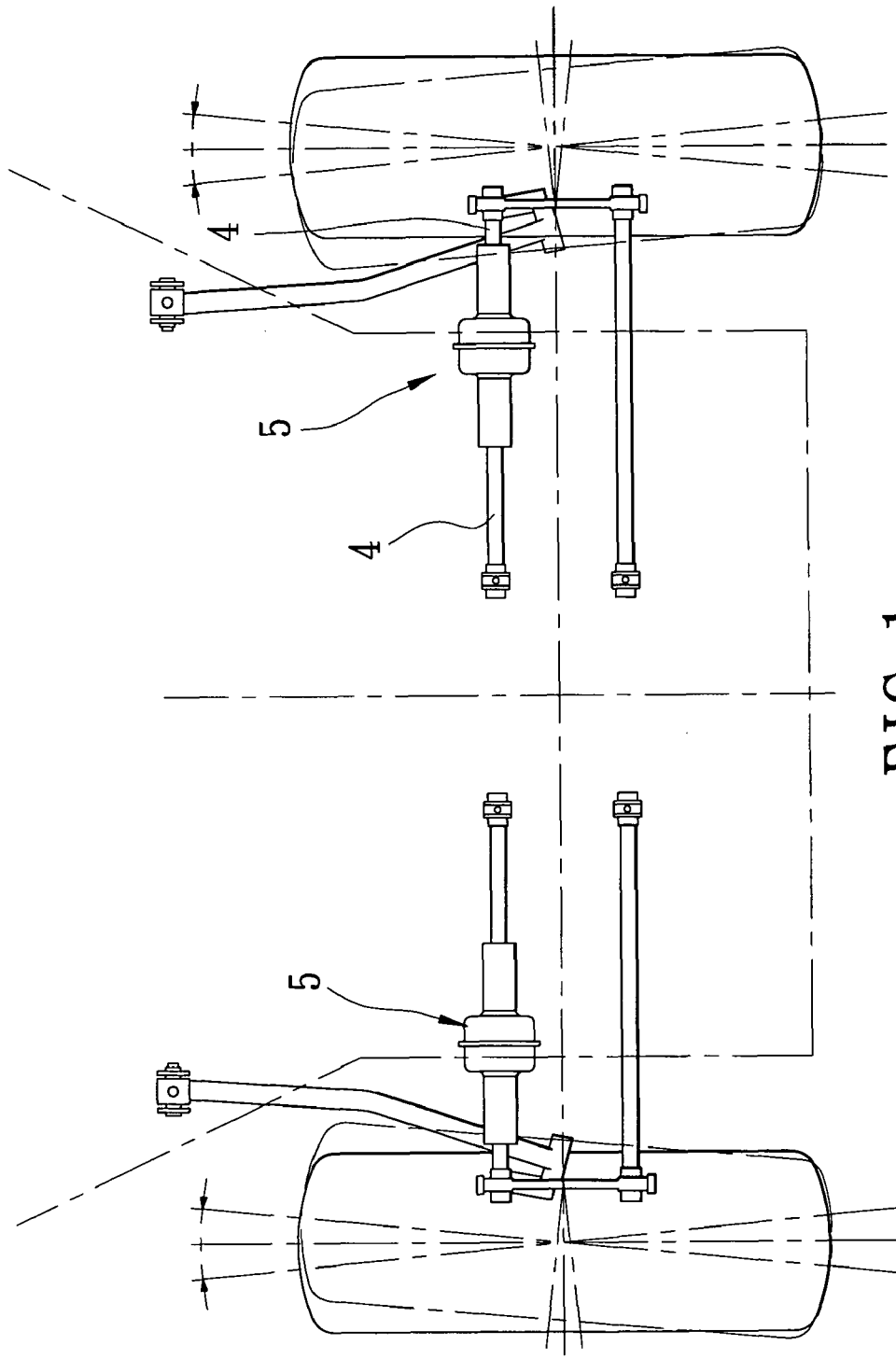
FIG. 1 is a plan view of a vehicle equipped with a conventional driving device for adjusting an orientation of a vehicle wheel.
Figure 2:
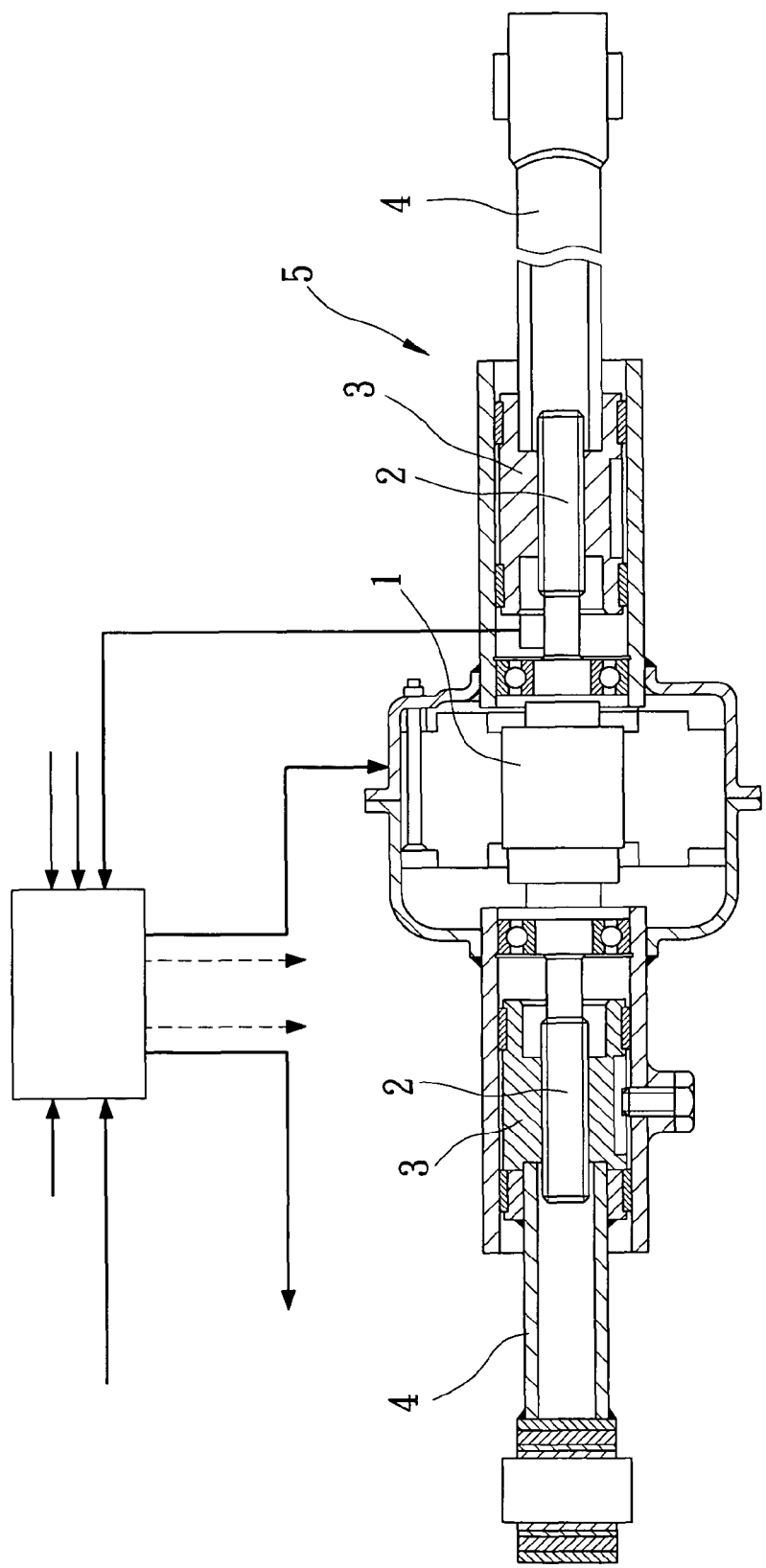
FIG. 2 is a cross-sectional view of the driving device shown in FIG. 1.
Figure 3:
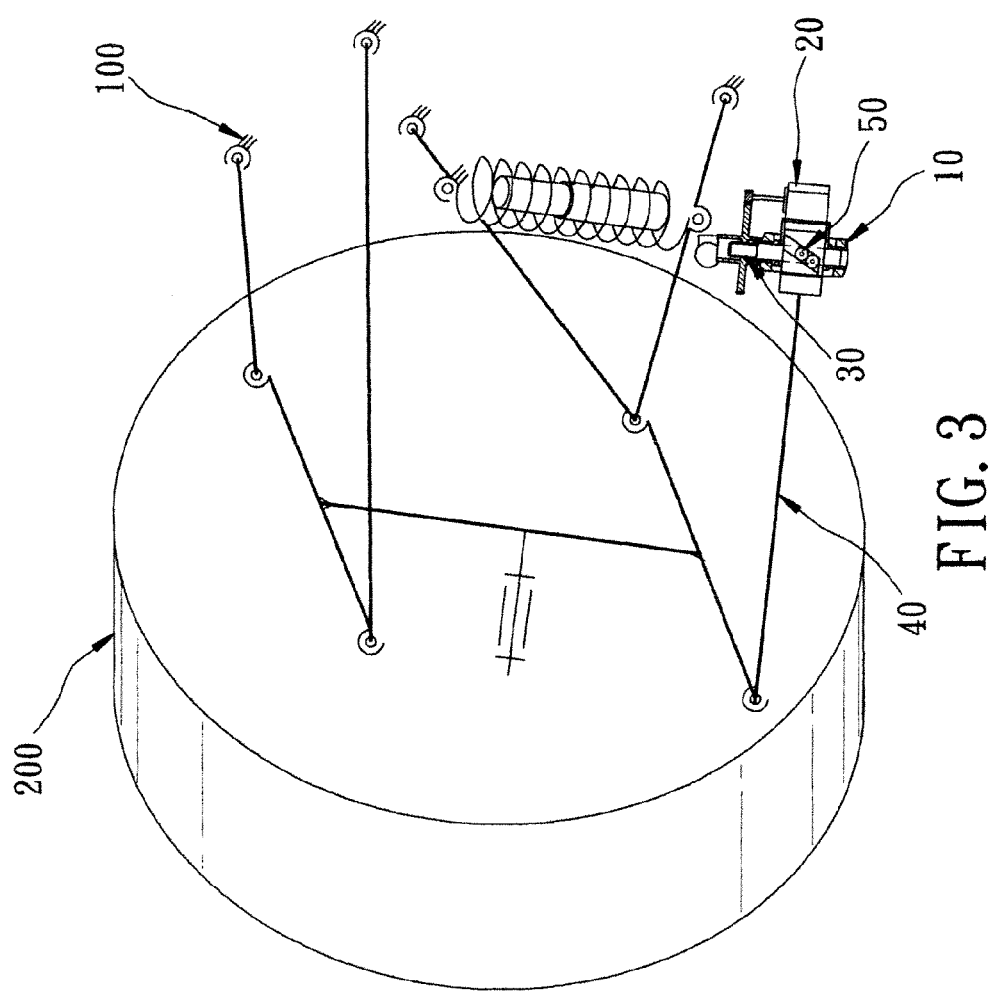
FIG. 3 is a schematic view of a driving device for adjusting an orientation of a vehicle wheel according to the preferred embodiment of the present invention.
Figure 4:
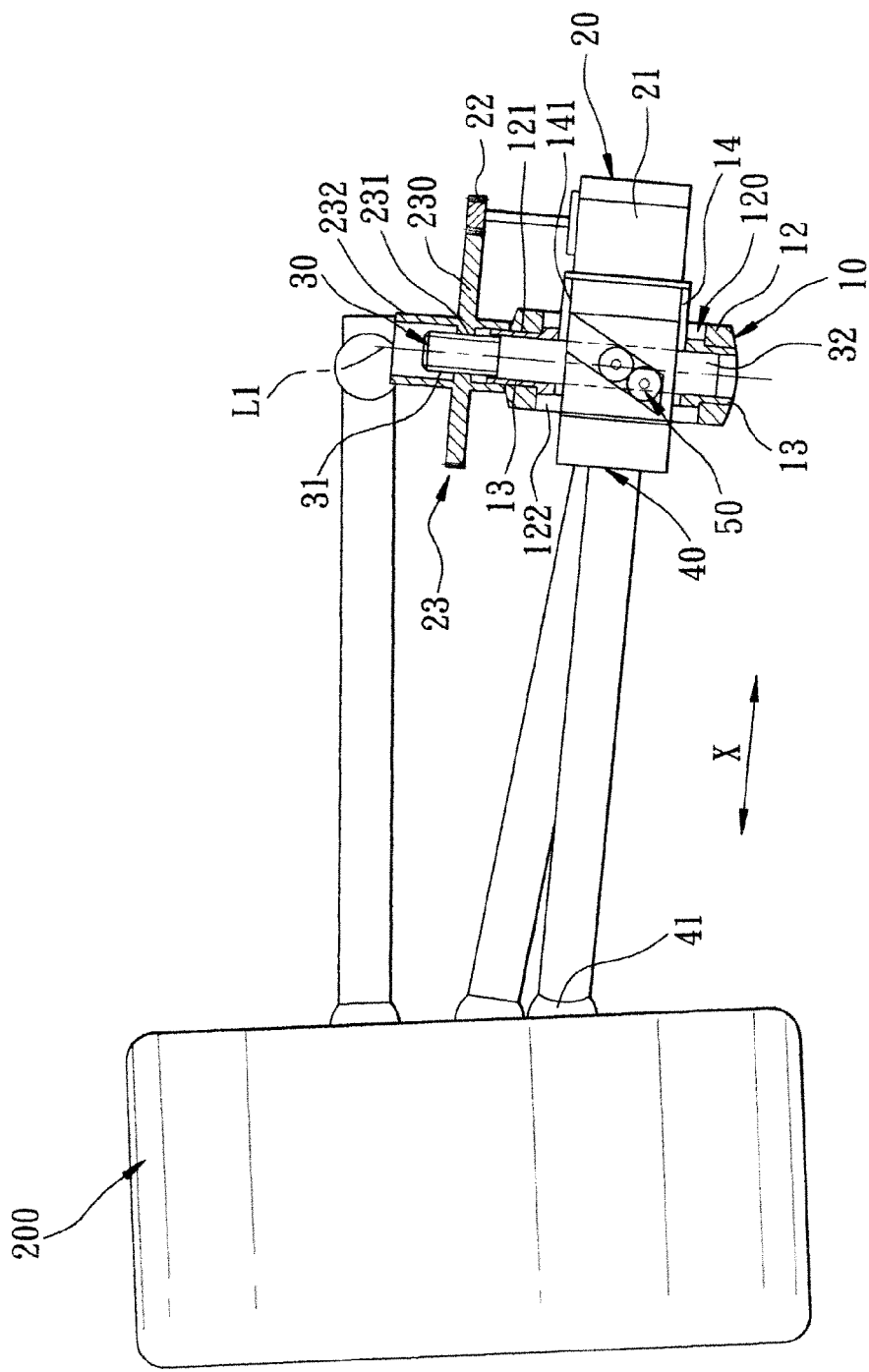
FIG. 4 is an elevation view of the driving device shown in FIG. 3.

Referring to FIGS. 3 to 6, a driving device for adjusting an orientation of a vehicle wheel 200 according to the present invention is disposed between a vehicle body 100 and the vehicle wheel 200. The driving device includes: a mounting unit 10 connected pivotally to the vehicle body 100; a driving unit 20 disposed on the mounting body 10; a lifting shaft 30 extending along a first axis (L1) and capable of moving axially when driven by the driving unit 20; a suspension arm 40 extending along a transverse direction (X) perpendicular to the first axis (L1); and a cam unit 50 disposed between the lifting shaft 30 and the suspension arm 40.

The mounting unit 10 includes a main body 12, two sleeve bodies 13, and a guide body 14. The main body 12 is adapted to be connected to the vehicle body 100, and is rotatable about a second axis (L2) that is perpendicular to both of the first axis (L1) and the transverse direction (X). The connection of the main body 12 to the vehicle body 100 may be accomplished using a universal joint or other suitable means. The main body 12 has a receiving hole 120 including a first hole section 121 for extension of the lifting shaft 30 and a second hole section 122 for extension of the suspension arm 40 and the guide body 14. The first hole section 121 extends along the first axis (L1) and intersects the second hole section 122. The sleeve bodies 13 are disposed in the first hole section 121 and are sleeved around the lifting shaft 30. The sleeve bodies 13 are rotatable about the first axis (L1) and relative to the main body 12. The guide body 14 is disposed in the second hole section 122 and is fixed between the sleeve bodies 13. The guide body 14 has a guide groove 141 extending along the transverse direction (X).

The driving unit 20 includes a motor 21 mounted to the guide body 14, a first gear wheel 22 driven by the motor 21, and a second gear wheel 23 driven by and engaging with the first gear wheel 22.

In the preferred embodiment, the motor 21 is a servo motor. The second gear wheel 23 has a toothed disc 230 and a tubular hub 232. The toothed disc 230 is formed with a central screw hole 231. The tubular hub 232 is formed around the central screw hole 231, projects axially from the toothed disc 230, and is disposed rotatably around one of the sleeve bodies 13.

The lifting shaft 30 includes a screw rod section 31 and a flat non-threaded rod section 32. The screw rod section 31 is engaged threadedly with the central screw hole 231 and extends into the tubular hub 232. The non-threaded rod section 32 extends movably through the sleeve bodies 13 and the suspension arm 40. The lifting shaft 30 is driven by the second gear wheel 23 to move along the first axis (L1).

The suspension arm 40 includes one end portion 41 connected to the vehicle wheel 200, and another end portion 42 disposed in proximity to the lifting shaft 30 and inserted slidably into the guide groove 141. The end portion 42 has a slide slot 421 and an inclined groove 422. The slide slot 421 extends along the first axis (L1) for extension of the non-threaded rod section 32 of the lifting shaft 30. The inclined groove 422 is inclined with the first axis (L1).

Figure 5:
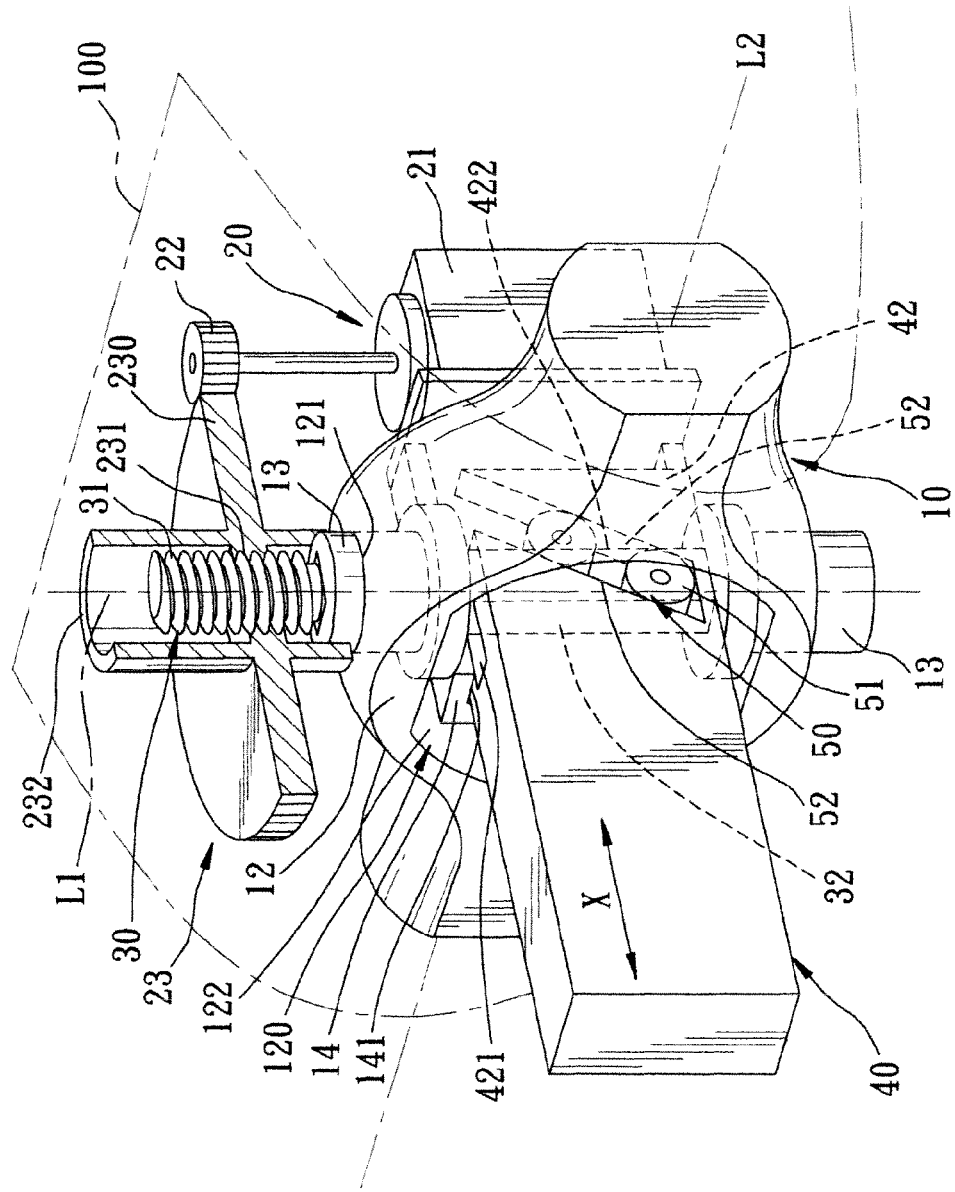
FIG. 5 is a fragmentary perspective view of the driving device shown in FIG. 4.

The cam unit 50 includes a pair of rollers 51 and a pair of parallel inclined cam faces 52. The rollers 51 are rotatably connected to the non-threaded rod section 32, and the inclined cam faces 52 are formed on two opposite sides of the inclined groove 422. In other words, as best shown in FIG. 5, the inclined groove 422 is defined between the inclined cam faces 52 for receiving the rollers 51. Accordingly, each of the rollers 51 is disposed between and is in contact with the inclined cam faces 52. The rollers 51 and the inclined cam faces 52 interact with each other such that the suspension arm 40 moves along the transverse direction (X).

When the suspension arm 40 moves along the transverse direction (X), the suspension arm 40 is also rotatable relative to the vehicle body 100, since the suspension arm 40 is inserted slidably into the guide groove 141 of the guide body 14 which in turn is fixed between the sleeve bodies 13 that are rotatable relative to the main body 12 and around the first axis (L1), and since the main body 12 of the mounting unit 10 is rotatable about the second axis (L2) and relative to the vehicle body 100. Accordingly, the suspension arm 40 is rotatable universally.

Next, an interaction of the rollers 51 and the inclined cam faces 52 will be described hereinafter.

Figure 6:
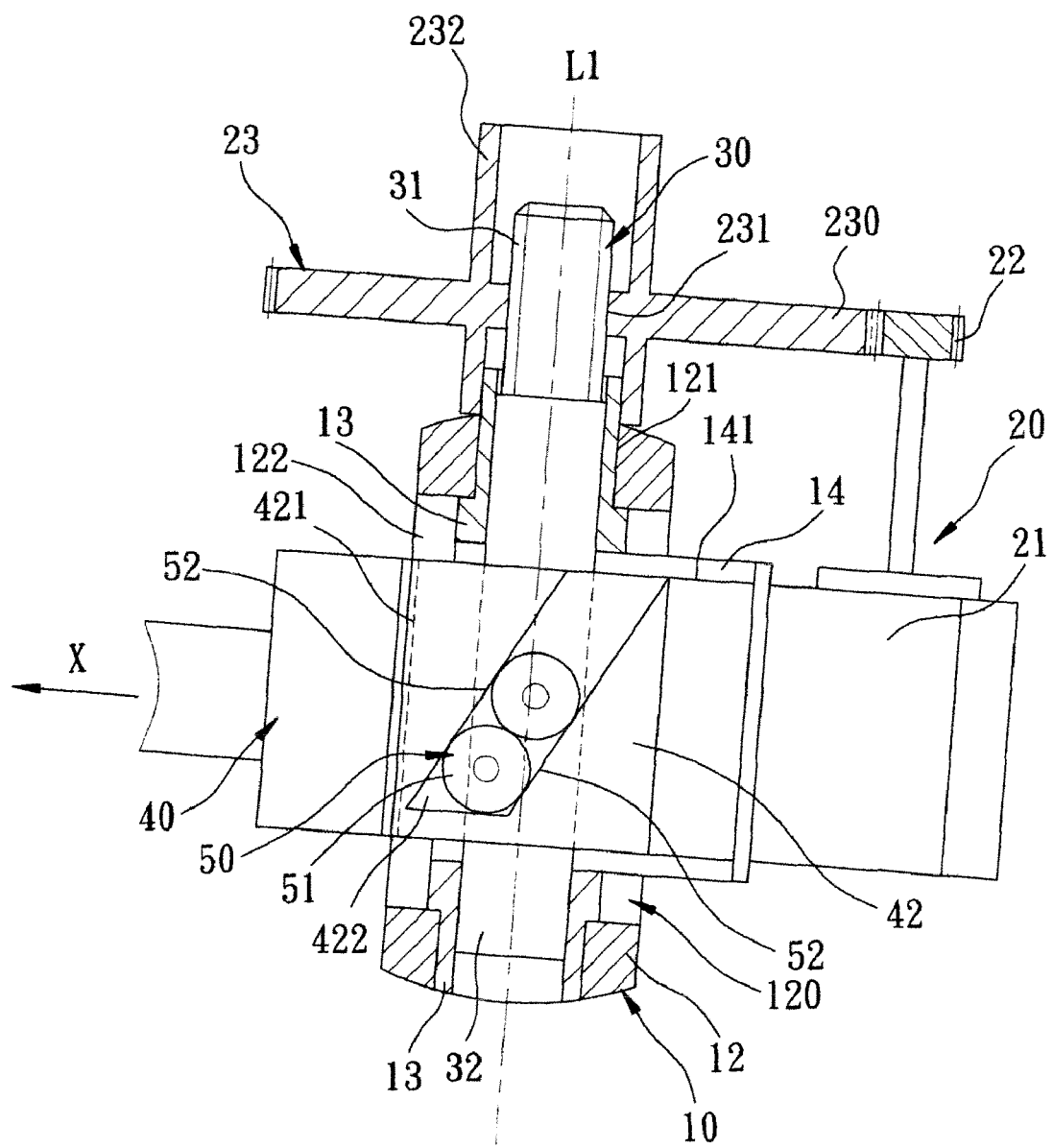
FIG. 6 is an enlarged cross-sectional view of the driving device shown in FIG. 4.

As shown in FIG. 6, when the rollers 51 are near a bottom of the inclined groove 422, the end portion 42 of the suspension arm 40 is relatively close to the motor 21.

Figure 7:
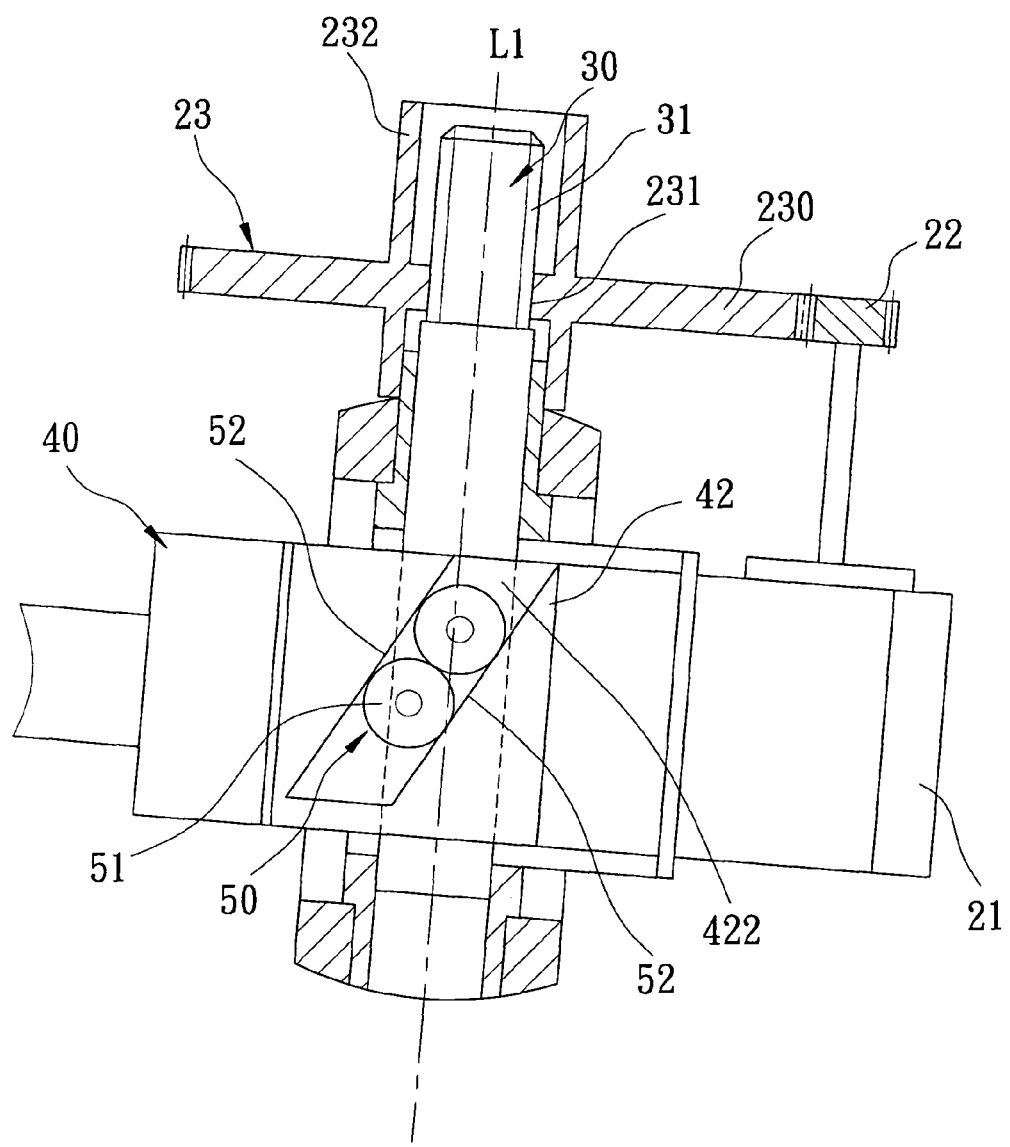
FIG. 7 is the same view as FIG. 6 but illustrating a lifting shaft of the driving device when moved upward.

When the motor 21 is operated, the first gear wheel 22 is driven to drive the second gear wheel 23, and the lifting shaft 30 is driven by the second gear wheel 23 to move along the first axis (L1). When the lifting shaft 30 is moved upward from a position shown in FIG. 6, the rollers 51 move upward. Therefore, the left one of the inclined cam faces 52 is pushed upward and leftward (arrow X in FIG. 6), thereby moving the end portion 42 of the suspension arm 40 leftward and away from the motor 21 as shown in FIG. 7. The orientation of the wheel 200 is thus adjusted.

Conversely, when the motor 21 rotates in a reverse direction, the lifting shaft 30 will move downward, and the rollers 51 will push the other inclined cam face 52 downward and rightward so that the suspension arm 40 can be moved rightward.

The driving device of the present invention has a simple structure. Furthermore, since the mounting unit 10 is installed on the vehicle body 100, and since the driving unit 20 and the lifting shaft 30 supported on the mounting unit 10 do not add any weight to the suspension arm 40, a vehicle that utilizes the driving device of the present invention can have a reduced unsprung mass.

Moreover, since the suspension arm 40 of the driving device according to the present invention is a single piece component, the robustness thereof is high compared to the prior art.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A driving device for adjusting a orientation of a wheel attached to a vehicle body, comprising:
    a driving unit;
    a lifting shaft extending along a first axis and capable of moving axially when driven by said driving unit;
    a suspension arm extending along a transverse direction intersecting said first axis, and having one end portion adapted for connection with the wheel and another end portion disposed in proximity to said lifting shaft; and
    a cam unit provided on said lifting shaft and said suspension arm to move said suspension arm in said transverse direction when said lifting shaft moves axially;
    wherein said cam unit includes at least one roller connected to one of said lifting shaft and said suspension arm, and at least one inclined cam face provided on the other one of said lifting shaft and said suspension arm, said roller and said inclined cam face interacting with each other such that said suspension arm moves along said transverse direction.

2. The driving device of claim 1, further comprising a mounting unit that includes:
    a main body adapted to be connected to the vehicle body and having a receiving hole;
    two sleeve bodies disposed in said receiving hole and rotatable relative to said main body; and
    a guide body fixed between said sleeve bodies within said receiving hole and having a guide groove;
    said another end portion of said suspension arm being inserted slidably into said guide groove;
    said lifting shaft extending movably through said sleeve bodies and said suspension arm.

3. The driving device of claim 2, wherein said main body is rotatable about a second axis transverse to said first axis and said transverse direction.

4. The driving device of claim 2, wherein said driving unit includes:
    a motor disposed on said mounting unit;
    a first gear wheel driven by said motor; and
    a second gear wheel driven by and engaging with said first gear wheel;
    wherein said lifting shaft is engaged threadedly with said second gear wheel such that said lifting shaft is driven by said second gear wheel to move axially.

5. The driving device of claim 4 wherein said second gear wheel is formed with a central screw hole, and said lifting shaft has a screw rod engaged threadedly with said screw hole of said second gear wheel.

6. The driving device of claim 5, wherein said second gear wheel has a toothed disc having said central screw hole, and a tubular hub formed around said central screw hole and projecting axially from said toothed disc, said screw rod extending into said tubular hub.

7. The driving device of claim 1, wherein said cam unit includes a pair of said inclined cam faces formed in parallel to each other on said suspension arm, said roller being rotatably connected to said lifting shaft.

8. The driving device of claim 7, wherein said suspension arm further has a slide slot extending along said first axis for extension of said lifting shaft, and an inclined groove inclined with said first axis for receiving said roller, said inclined groove having said pair of inclined cam faces, said roller being disposed between and being in contact with said inclined cam faces.

* * * * *